F. G. FARNHAM.

Glove-Fastening.

No. 8,445. Reissued Oct. 8, 1878.

*Attest:*

L. M. Sully

P. D. Dyer.

*Inventor:*

Frank Gunn Farnham by Geo. W. Dyer & Co attys

N. PETERS, PHOTO-LITHOGRAPHER, WASHINGTON, D. C.

UNITED STATES PATENT OFFICE.

FRANK G. FARNHAM, OF HAWLEY, PENNSYLVANIA.

IMPROVEMENT IN GLOVE-FASTENINGS.

Specification forming part of Letters Patent No. 173,218, dated February 8, 1876; Reissue No. 8,445, dated October 8, 1878; application filed September 8, 1877.

*To all whom it may concern:*

Be it known that I, FRANK GUNN FARNHAM, of Hawley, Wayne county, Pennsylvania, have invented a new and useful Improvement in Glove-Fastenings, of which the following is a specification:

The invention, which is hereinafter described, is intended particularly for glove-fastenings; but it will become apparent that it can, without change, be well adapted for use upon shoes, corsets, or other articles of clothing where two edges or flaps are to be fastened together.

The object of the invention is to provide a simple, cheap, and effective substitute for buttons and button-holes, for hooks and eyes, and for strings or lacings, which substitute shall have the advantages of buttons in holding the parts securely in place, and of strings and lacings in aiding to draw the parts together.

My device consists in two plates, one of which is secured to each flap of the glove or other garment, on one of which plates is an arch, upon the cross-piece of which a slotted lever-key has play endwise, while the other plate has an opening of a size sufficient to allow the slotted lever-key to pass entirely through it, as well as the arch with which it is connected, so that where such arch has passed through such opening and the lever has been drawn endwise over its cross-piece the two plates will rest one upon the other.

The novelty of my invention consists in the combination of the elastic slotted lever-key, secured to one flap of the glove or other article of clothing, and a slotted plate upon the other flap; in the peculiar construction of the plate to which the slotted lever-key is pivoted; and in the combination of both plates, all as more fully hereinafter described.

In order that those skilled in the art may know how to make and use my fastenings, I proceed to describe the same, having reference to the drawings, in which—

Figure 1:
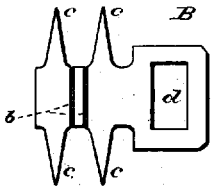
Figure 2:
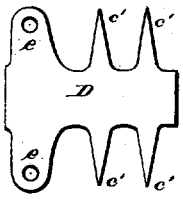
Figure 3:
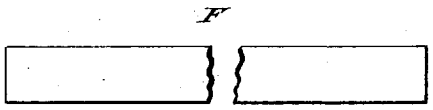
Figure 4:
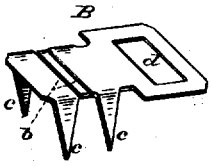
Figure 5:
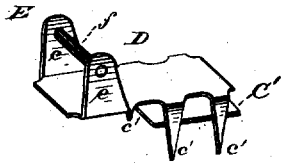
Figure 6:
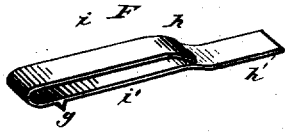
Figure 7:
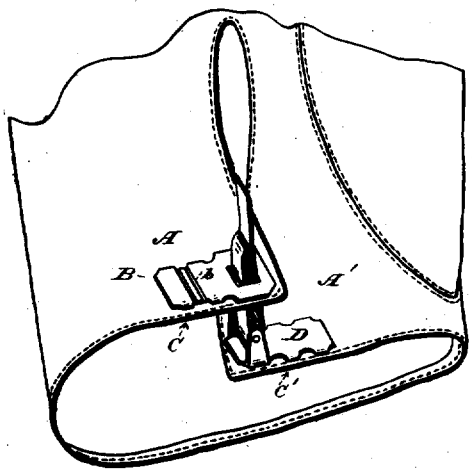
Figure 8:
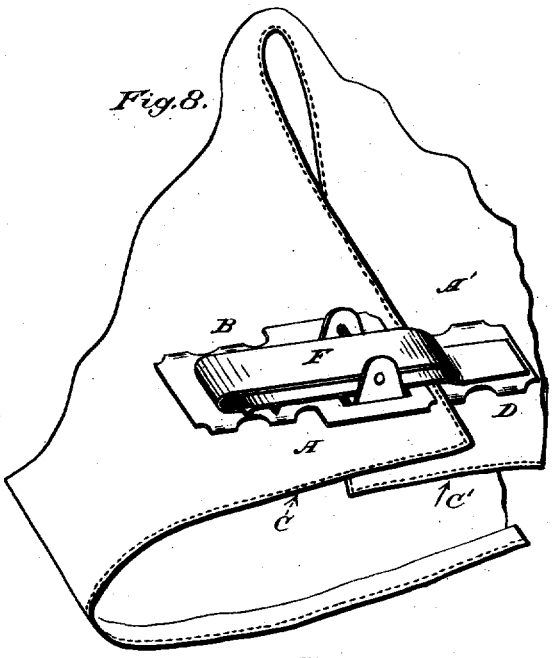

Figure 1 represents one of the plates as struck out of sheet metal; Fig. 2, the other plate as struck out of sheet metal. Fig. 3 is the blank for the slotted lever-key as struck out of sheet metal; Fig. 4, the plate shown in Fig. 1 with the prongs bent down; Fig. 5, the plate shown in Fig. 2 with the prongs bent down and the wings bent up, and the washer for the same; Fig. 6, the slotted lever-key as bent into proper form for use; Fig. 7, the several parts in position upon flaps, with the end of the slotted lever-key passing through its proper plate; Fig. 8, the several parts in position and the flaps brought together and secured in place.

Similar letters denote corresponding parts in each figure.

In the drawings, A A′ represent the flaps which are to be fastened together. To the outside of the flap A the plate B is secured, as will hereinafter be described. This plate is made in any convenient way from proper sheet metal, preferably by striking it out with suitable dies, and has a body, upon which are ratchet-teeth or corrugations *b* and four pointed prongs, *c c*, both the ratchet and the prongs being preferably near one end of the plate, as shown in the drawings. Beyond the ratchet the plate extends a sufficient distance to be pierced with an opening, *d*, of a size and form to allow the passage through it of an arch and a slotted lever-key, to be described presently. This plate is secured to the flap, the prongs *c c* being bent down at right angles by passing the points of the prongs down through the flap, and then binding their points at right angles again, and thus clinching them. This mode of fastening is made more effectual upon gloves and thin and slight articles of clothing by the employment of the washer C′, of suitable form, which gives a better hold to the points of the prongs, and thus a stiffer and stronger fastening may be secured. The plate D, also struck out or made of thin sheet metal in any convenient way, has pointed prongs *c′ c′*, similar to those upon the plate B, and arranged at one end of the plate, and at or near the other end tapering wings *e*. When these wings are bent up at right angles, and are connected by a cross-piece or pin, *f*, this portion becomes the arch E, with a base larger than its top and with sides sloping longitudinally. This plate D is secured upon the outer surface of its flap in such a position preferably to bring the outer portion of the arch about on the line of the edge of the flap by bending down the prongs at right angles, passing them through the flaps, and bending or clinching them upon the under side, making use of the washer C′ in order to make a more secure hold whenever the same may be essential.

The slotted lever-key F is also cut, struck, or made out of suitable thin elastic sheet metal in any convenient way, and of a width sufficient to pass freely along the interior of the arch F. This key has upon one portion of it a tooth, *g*, adapted to engage with the ratchet *b*. This key is inserted in the interior of the arch E, below the cross-piece or pin *f*, and then bent back over itself so that the two ends *h h′* come near together, leaving the tooth *g* on the lower part and near the bent end of the key. The upper portion, *i*, of this key having been secured or attached to the lower portion, *i′*, in any convenient way, it follows that this key is secured upon the cross-piece or pin *f*, so that it cannot be detached or lost, and yet has freedom of motion throughout the entire length between the upper and lower portions *i i′*, and at the same time the interior side walls of the arch serve as guides, except when the key is in a vertical position, and insure its direct movement back and forth.

The mode of operation of my device is as follows: The plates being in proper position upon the flaps and ready for use, and the flaps separated, the flaps are brought together by hand sufficiently to allow the ends *h h′* of the key, which is now drawn out to its fullest extent, to be inserted up through the opening *d* in the plate B, so that it may be seized by the thumb and forefinger. The ends *h h′* are drawn backward, and the key serves as a lever and the edge of the opening *d* as a fulcrum, by means of which the flaps are drawn toward each other and the arch E is drawn up through said opening and the plate B rests upon the plate D. The key at this period of time has been drawn back and pressed down in a horizontal position and rests upon the plate B. The fastening is then made by pushing the key along endwise within the arch and upon the cross-piece or pin *f*, so that its opposite ends rest upon the plates B and D, and the cross-piece or pin *f* is near the center of the key. Ordinarily the pressure of that part of the body within the glove or other article of wear will hold the key in position by reason of the spring or elastic pressure of the key; but to insure the holding of it in position the tooth *g*, engaging with the ratchet *b*, will be found convenient. When it is desired to unfasten the flaps, the key is slid back so that it may be raised to a vertical position, and the pressure of the portion of the body within the glove or other article will withdraw the key and the arch and the flaps will separate.

The advantages of my construction and arrangement of parts are obvious. They are simple, cheaply made, and sufficiently durable. They take but little room, are ornamental, and are conveniently managed. It is essential to have the key act as a lever to draw the flaps together. It is essential to have the key act as a toggle, because that form of fastening is the simplest and most secure. To this end the key must be slotted, and that it may be effective it must be elastic and exert a spring-pressure. The sloping sides of the arch are essential, as otherwise it would stick or jam in the opening in the plate B and prevent unfastening. The prongs are the simplest and cheapest mode of fastening.

Having thus described my fastening and enumerated some of its advantages, what I claim as new therein and of my own invention is—

1. In a fastening for flaps of gloves and other articles of clothing, an elastic slotted lever-key secured to one flap and adapted to be threaded up through a plate upon the other flap and drawn across upon the outside of the same, and means to hold the slotted lever-key in position after the flaps are secured together by said key, which serves as a toggle, substantially as described.

2. In a fastening for the flaps of gloves and other articles of clothing, and in combination with such flaps, the plate D, having the prongs *c′ c′*, and the arch E, with sloping sides, substantially as described.

3. A fastener for gloves and other articles of clothing, composed of the plate B, having prongs *c c* and openings *d*, and the plate D, having the arch E and pivoted lever-key F, substantially as described.

FRANK GUNN FARNHAM.

Witnesses:
L. W. SEELY,
R. N. DYER.